United States Patent [19]
Moriyama

[11] Patent Number: 5,163,041
[45] Date of Patent: Nov. 10, 1992

[54] SIGNAL BRANCHING METHOD APPLIED TO A PROTECTION SWITCHING EQUIPMENT PROVIDED IN A DROP-INSERT STATION OF A TRANSMISSION SYSTEM

[75] Inventor: Junichi Moriyama, Kawasaki, Japan
[73] Assignee: Fujitsu Limited, Kanagawa, Japan
[21] Appl. No.: 598,240
[22] Filed: Oct. 16, 1990
[30] Foreign Application Priority Data Oct. 18, 1989 [JP] Japan .................. 1-270686

[51] Int. Cl.$^5$ .......................... H04J 1/16; H04J 3/14
[52] U.S. Cl. ...................... 370/16; 371/8.2; 371/11.2
[58] Field of Search ............ 370/13, 13.1, 16, 55; 371/8.1, 8.2, 11.1, 11.2, 20.1, 20.2; 379/4, 31, 2, 32

[56] References Cited
U.S. PATENT DOCUMENTS

| | | | |
|---|---|---|---|
| 2,802,990 | 8/1957 | Eriksen | 370/16 |
| 3,991,278 | 11/1976 | Fang et al. | 370/16 |
| 4,393,493 | 6/1983 | Edwards | 370/16 |
| 4,598,399 | 7/1986 | Bath | 370/16 |

*Primary Examiner*—Douglas W. Olms
*Assistant Examiner*—Wellington Chin

[57] ABSTRACT

A line terminal equipment provided in a drop-insert station of a transmission system for receiving a signal from a preceding station of the drop-insert station through a preceding protection line is electrically connected in a protection switching equipment provided in the drop-insert station, to a line terminal equipment provided in the drop-insert station for transmitting the signal to a succeeding station of the drop-insert station, by a connecting line provided in the protection switching equipment, in any one of cases where no disconnection trouble occurs on preceding and succeeding work lines, where disconnection troubles occur on one of the preceding work lines and a succeeding work line associated with the preceding work line and where a disconnection trouble occurs on one of the preceding work lines. The connecting line is disconnected in a case where a disconnection trouble occurs on one of the succeeding work line.

7 Claims, 7 Drawing Sheets

FIG.6(b) (CASE I)

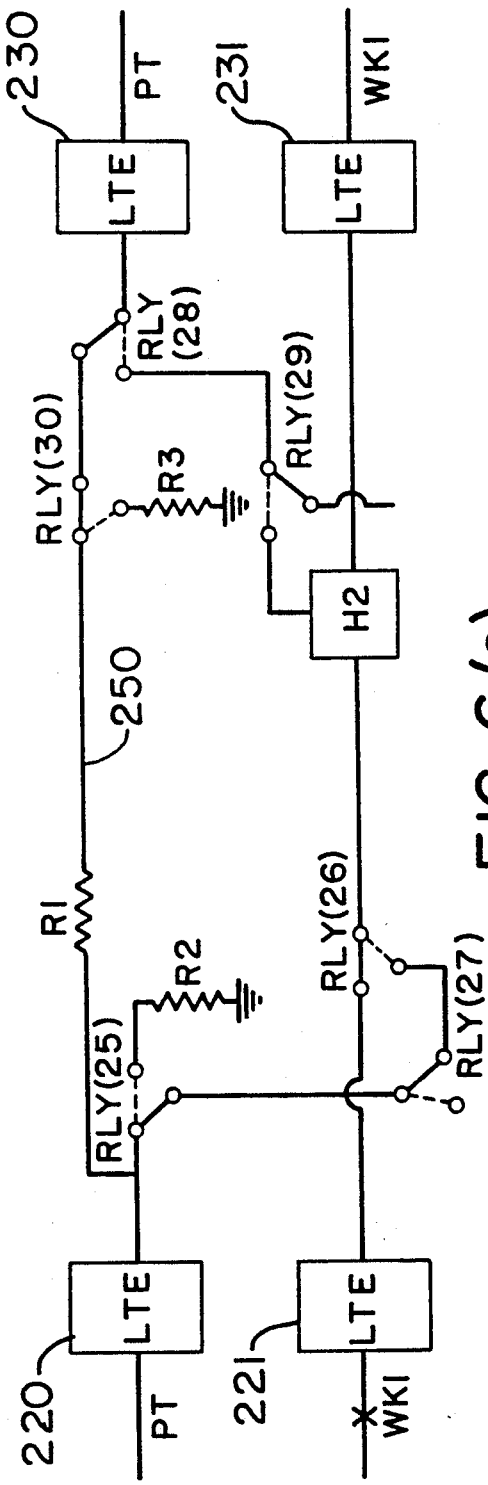
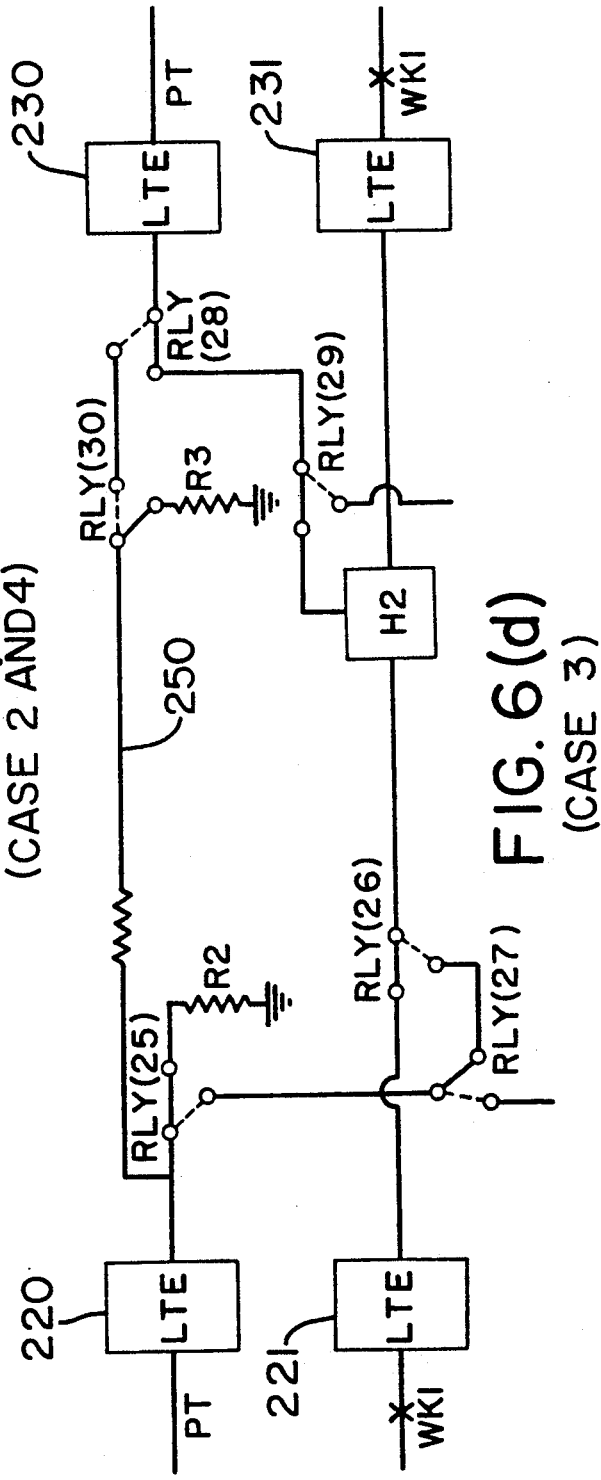
FIG. 6(c) (CASE 2 AND 4)
FIG. 6(d) (CASE 3)

5,163,041

SIGNAL BRANCHING METHOD APPLIED TO A PROTECTION SWITCHING EQUIPMENT PROVIDED IN A DROP-INSERT STATION OF A TRANSMISSION SYSTEM

BACKGROUND OF THE INVENTION

1. Field of the Invention

The present invention relates to a signal branching method applied to a protection switching equipment provided in a drop-insert station of a transmission system.

2. Description of the Related Art

A transmission system is for transmitting a users signal or data, which will be represented by a users signal hereinafter, through a transmission line starting from one end station to another end station and providing a plurality of drop-insert stations between the end stations in series. The transmission line consists of a plurality of work lines through which the users signals are transmitted and a protection line for protecting the users signal from meeting with failure of transmission due to an accident such as disconnection of the work line.

The protection line is also used for a liaison communication among the end and the drop-insert stations. However, in order to detect the disconnection of the protection line and to avoid producing alarm for envoying that a work line has a disconnection trouble to other stations, a protection signal is constantly transmitted through the protection line. Formerly, a dummy signal was expressly generated as the protection signal at the end stations and transmitted through the protection line. However, recently, one of the users signals transmitted through one of the work lines has come to be used instead of the dummy signal. This is for decreasing the size and the costs of each END station.

FIG. 1 is a block diagram of a transmission system of the related art. The transmission system consists of a transmission line, END stations placed at the both ends of the transmission line and a plurality of drop-insert stations placed between the END stations in series on the transmission line. The transmission line includes a plurality of the work lines (WKs 1, 2, - - - n) and a protection line (PT). FIG. 1 shows a case that the users signals and a protection signal are transmitted from an end station (END STN) 100 to a drop-insert station (DI STN) 200 adjacent to END STN 100 through a plurality of work lines WK1, WK2, - - - WKn and a protection line (PT) respectively.

In FIG. 1, the END STN 100 includes a line terminal equipment (LTE) 120 for transmitting the protection signal to DI STN 200 through PT and for transmitting and receiving the liaison signals between END STN 100 and DI STN 200 respectively, and END STN 100 includes LTEs 121, 122, - - - for transmitting the users signals to DI STN 200 through WK1, WK2, - - - respectively. The DI STN 200 includes LTEs 220 for receiving the protection signal from END STN 100 and for transmitting and receiving the liaison signals transferring between END STN 100 and DI STN 200, and DI STN 200 also includes LTEs 221, 222, - - - for receiving the users signals sent from END STN 100 through WK1, WK2, - - -, and DI STN 200 further includes LTEs 230, 231, 232, - - - at the ends of PT, WK1, WK2, - - - between DI STN 200 and a succeeding DI STN same as LTEs 120, 121, - - - respectively.

When the protection signal and the users signals are transmitted from or received at those LTEs, each of these signals always passes through a protection switching equipment (PSW). The PSW is for switching a transmitting route of a users signal to PT when WK for transmitting the users signal falls into a disconnection trouble. In FIG. 1, END STN 100 has PSW 101 and DI STN 200 has PSWs 201 and 202, PSW 201 is a receiver side PSW (Rx-PSW) and PSW 202 is a transmitter side PSW (Tx-PSW). Therefore, when the transmission line is normal, which means that there is no disconnection trouble in PT and WKs, the users signals given to END STN 100 are sent to LTEs 121, 122, - - - through a switch for WK1 (SW(WK1)), a switch for WK2 (SW(WK2)), - - - of PSW 101 in END STN 100, and the users signals arrived at LTEs 221, 222, - - - in DI STN 200 through WK1, WK2, - - - are sent to LTEs 231, 232, - - - in DI STN 200 through SWs(WK1) in Rx-PSW 201 and Tx-PSW 202, SWs(WK2) in Rx-PSW 201 and Tx-PSW 202 respectively, and the protection signal given to END STN 100 is sent to LTE 120 through a switch for PT (SW(PT)) in PSW 101, and the protection signal arrived at LTE 220 in DI STN 200 through PT is sent to LTE 230 in DI STN 200 through SWs(PT) in Rx-PSW 201 and Tx-PSW 202.

The details will be explained later, however, FIG. 1 shows a case of using a users signal as the protection signal, so that in FIG. 1, a users signal being to be transmitted through WK1 branches at a hybrid circuit (H) in SW(WK1) to SW(PT) in PSW 101. Therefore, the users signals are transmitted through WK1, WK2, - - - and WKn as shown by thick solid lines and the one of the users signal, for instance, the users signal to be transmitted through WK1 is used as the protection signal as shown by a thick solid line marked by PT. However, when WK1 has the disconnection trouble as shown by a mark "X" in FIG. 1, PSWs in END STN 100 and DI STN 200 operates as follows: SW(PT) in PSW 101 operates so that the users signal to be transmitted through WK1 is transmitted through PT between END STN 100 and DI STN 200; and in PSW of DI STN 200, SWs(PT) in Rx-PSW 201 and Tx-PSW 202, SWs(WK1) in Rx-PSW 201 and Tx-PSW 202 operate so that the users signal transmitted to DI STN 200 through PT is sent to SW(PT) in Tx-PSW 202 through SW(PT) and SW(WK1) in Rx-PSW 201 and SW(WK1) in Tx-PSW 202 as shown by a dotted thick line in FIG. 1. Because, though the users signal to be transmitted through WK1 has been transmitted from END STN 100 to DI STN 200 through PT, the users signal must be transmitted from DI STN 200 to the succeeding DI STN through WK1 but at the same time the users signal must branch to PT. This branching is made by H in Tx-PSW 202 of DI STN 200. The control performed thus in PSWs in END STN 100 and DI STN 200 has been too complex. The complexity will be explained in reference to FIG. 3 which shows another transmission system of the prior art.

Before explaining FIG. 3, a prior art transmission system including a dummy generator for generating a dummy signal as the protection signal will be explained in reference to FIG. 2. In FIG. 2, the same reference numeral or symbol as in FIG. 1 designates the same unit as in FIG. 1. Same as in FIG. 1, FIG. 2 shows a case of transmitting the users signals from END STN 100 to DI STN 200, and FIG. 2 depicts only one users signal transmitted through WK1. Generally, PSW has a control unit such that PSW in an END STN has a control unit called a master control unit and PSW in a DI STN has a control unit called a slave control unit. The master control unit controls not only the own PSW in the END STN but also the slave control units in DI STNs over the transmission system, and control signals required to be sent among the master control unit and the slave control units are transferred through PTs provided between END STN and DI STN and between END STNs. In FIG. 2, PSW 11' in END STN 100 includes a master control unit (MASTER CONT) 150' and PSW 21" in DI STN 200 has a slave control unit (SLAVE CONT) 210". The END STN 100 includes a dummy generator (DUMMY GEN) 130 for generating a dummy signal to be transmitted through PT as the protection signal when no disconnection trouble occurs in WKs. An SW(PT) 110' in PSW 11" includes two relays (RLY(11) and RLY(12)) and an SW(WK1) 111' in PSW 11' includes also two relays (RLY(13) and RLY(14)) so that the relays make connection as shown by a dotted line respectively when WKs have no disconnection trouble. Same as the above, PSW 21" in DI STN 200 has SW(PT) 211' including RLY(21) and RLY(22) and has SW(WK1) 212' including RLY(23) and RLY(24), making the relays connect circuits as shown by a dotted line respectively when WKs have no disconnection trouble. Therefore, when WKs have no disconnection trouble, the dummy singal is transmitted through PTs and the users signals are transmitted through WKs (only WK1 is depicted in FIG. 2) in the transmission system. However, when a disconnection trouble occurs, for example, a disconnection trouble occurs on WK1 as marked by X in the figure, LTE 221 in DI STN 200 detects that no users signal receives thereat and produces a detection signal for envoying the occurrence of the disconnection trouble to be sent to SLAVE CONT 210". When SLAVE CONT 210" receives the detection signal, SLAVE CONT 210" sends the detection signal to MASTER CONT 150' through LTE 220, PT between DI STN 200 and END STN 100 and LTE 120. When MASTER CONT 150' receives the detection signal, MASTER CONT 150' controls the own SW(PT) 110' and SW(WK1) 111' so that RLYs(11), (12), (13) and (14) make connection of circuits as shown in FIG. 2. After that, MASTER CONT 150' sends a command signal to SLAVE CONT 210" through LTE 120, PT and LTE 220. After receiving the command signal, SLAVE CONT 210" controls SW(PT) 211' and SW(WK1) 212" so that RLYs(21, 22, 23 and 24) make connection of circuits as shown in FIG. 2. (In each switch mentioned above has a hard soft interface (H/S INT) for making the hardware (relay) of each switch operate in accordance with a control signal sent from the control unit.) As a result, in END STN 100, the dummy signal from DUMMY GEN 130 is sent to LTE 121 but not sent to DI STN 21" because of the disconnection trouble, and the users signal to be sent to DI STN 200 through WK1 is switched to LTE 120 so as to be sent to DI STN 200 through PT, and in DI STN 200, the users signal sent to LTE 220 is switched to LTE 231 and sent to the succeeding DI STN through WK1 and an alarm signal produced in LTE 221 for envoying the occurrence of the disconnection trouble to the other stations is sent to LTE 230 through RLY(24) and RLY(21) so as to be sent to the succeeding DI STN through PT between DI STN 200 and the succeeding DI STN.

Different from FIG. 2, FIG. 3 is a case of using a users signal as the protection signal instead of the dummy signal. (The branch circuit of the users signal is not depicted in the figure.) In FIG. 3, the same reference numeral or symbol as in FIG. 2 designates the same unit as in FIG. 2, and FIG. 3 is also a case of transmitting the users signal from END STN to DI STN. Therefore, in FIG. 3, one of the users signals to be sent through WKs is sent to RLY(15) in SW(PT) 110 in PSW 11' of END STN 100. When no disconnection trouble occurs on WKs, CONT 150 controls SW(PT) 110 and SW(WK1) 111 so that the relays in PSW 11' of END STN 100 and in PSW 21' of DI STN 200 make connection of circuits as shown by a dotted line in each relay. As a result, a users signal used as the protection signal is transmitted through PT and the users signal to be sent through WK1 is transmitted through WK1 straight from END STN 100 to the succeeding DI STN through DI STN 200 as shown in FIG. 3.

When WK1 has a disconnection trouble in FIG. 3, the trouble is detected at LTE 221 in DI STN 200 and a detection signal is output from LTE 221 to SLAVE CONT 210' in PSW 21' of DI STN 200. Then, same as described in reference to FIG. 2, SLAVE CONT 210' sends the detection signal to MASTER CONT 150 in PSW 11' of END STN 100, through PT. When MASTER CONT 150 receives the detection signal, MASTER CONT 150 controls SW(PT) 110 and SW(WK1) 111 so that the relays in the switches make connection of circuits as shown in FIG. 3. After controlling the relays in PSW 11', MASTER CONT 150 sends a command signal to SLAVE CONT 210' in PSW 21' of DI STN 200. When SLAVE CONT 210' receives the command signal from MASTER CONT 150, SLAVE CONT 210' controls SWs(PT) 211'(a) and 211'(b) and SWs(WK1) 212(a) and 212(b) so that the relays in the switches make contact as shown in FIG. 3.

As a result, in END STN 100, a users signal to be sent through WK1 branches at H1 in SW(WK1) 111 and is relayed to LTE 120 so that the users signal is sent to DI STN 200 through PT instead of WK1, and the protection signal (one of the users signals) is stopped from being sent to DI STN 200 by RLY(15) in SW(PT) 110 of PSW 11'. In DI STN 200, the alarm signal output from LTE 221 is stopped from being sent to LTE 2 30 by RLY(26) in SW(WK1) 212(a), and the users signal sent from END STN 100 through PT is received at LTE 220 and switched to LTE 231 by RLY(25) in SW(PT) 211'(a) and RLYs(26 and 27) in SW(WK1) 212(a). The users signal switched to LTE 231 branches to SW(PT) 211'(b) by H2 in SW(WK1) 212b and is relayed to LTE 230 by RLY(28) in SW(PT) 211'(b) so as to be used as a protection signal transmitted from DI STN 200 to the succeeding DI STN through PT.

Comparing the transmission systems in FIGS. 2 and 3, the system in FIG. 3 is superior to the system in FIG. 2. Because, the DUMMY GEN is not necessary to be provided to END STN 100 in FIG. 3, which results in reducing the size and costs of END STN 100.

In FIG. 3, MASTER CONT 150 and SLAVE CONT 210' have a central processing unit (CPU) respectively. Using the CPU of MASTER CONT 150, MASTER CONT 150 controls not only the switches in PSW 11' of END STN 100 but also SLAVE CONT 210' by sending the command signal from MASTER CONT 150 to SLAVE CONT 210', and using the CPU in SLAVE CONT 210', SLAVE CONT 210' controls the switches in PSW 21' of DI STN 200.

FIG. 4(a) shows a control flow chart of MASTER CONT 150 in FIG. 3. Because of software previously provided to CPU in MASTER CONT 150, MASTER CONT 150 operates as follows:

periodically scans (SCAN START) whether there is a disconnection trouble in WK (ALM?);

when MASTER CONT 150 receives a detection signal envoying the occurrence of the disconnection trouble, MASTER CONT 150 searches where the detection signal comes from and recognizes that the signal comes from WK1 for instance (WHERE? WK1);

then, MASTER CONT 150 controls RLYs(15) and (16) in PSW 11' of END STN 100 so as to make connection of circuits as shown in FIG. 3 and sends a command signal to SLAVE CONT 210' through LTE 120, PT and LTE 220 so that SLAVE CONT 210' controls RLYs(25), (26) and (27) so as to make connection of circuits as shown in FIG. 3 (RLYs(15, 16, 25, 26 and 27));

after that, MASTER CONT 150 polls SLAVE CONT 210' whether PT provided between DI STN 200 and the succeeding DI STN can be used for transmitting a users signal, polling whether a disconnection trouble occurs on the PT (PT OK?);

when the PT must be used for users signal because of the disconnection trouble (PT OK?—NO), MASTER CONT 150 asks whether the succeeding station is another END STN (END STN?);

if the answer in response to (END STN?) is YES, MASTER CONT 150 has no necessity to do any control (END);

when PT is not necessary to be used for the users signal (YES), MASTER CONT 150 sends a command signal to SLAVE CONT 210' so that SLAVE CONT 210' controls RLY(29) so as to make connection of circuit as shown in FIG. 3 (RLY(29) ON);

MASTER CONT 150 sends a command signal to SLAVE CONT 210' so that SLAVE CONT 210' controls RLY(28) so as to make connection of circuit as shown in FIG. 3 (RLY(28) ON); and the control to be performed by MASTER CONT 150 is ended (END).

As described in reference to FIG. 4(a), the control due to MASTER CONT 150 in FIG. 3 has been very complex, so that it has taken a lot of switching time when a disconnection trouble occurs in WK. Reducing the switching time is very important, because, if the switching time exceeds a designated time in the transmission system, the exceeding switching time would cause to stop the operation of other communication equipment such as an exchange equipment connected to the transmission system. How to reduce the switching time has been a problem in the protection switching equipment of the transmission system.

SUMMARY OF THE INVENTION

Therefore, an object of the present invention is to reduce the switching time wasted when a transmitting route of the users signal is switched from the work line to the protection line by the protection switching equipments in the end station and the drop-insert station of the transmission system when a work line for transmitting the users signal has the disconnection trouble.

Another object of the present invention is to reduce the costs of the protection switching equipment, in particular, reducing the costs of software used to a CPU in each control unit of each protection switching equipment.

Still another object of the present invention is to increase the operation reliability of the transmission system.

The above objects of the present invention are achieved by connecting a line terminal equipment provided in the drop-insert station for receiving a signal from a preceding station of the drop-insert station through a protection line to another line terminal equipment provided in the drop-insert station for transmitting the signal to the succeeding station of the drop-insert station through another protection line, by an electrically connecting line provided in the protection switching equipment of the drop-insert station.

The protection switching equipment is provided in the end station and the drop-insert stations respectively and has a CPU for controlling switches in the protection switching equipment. In particular, a master control unit provided in the end station controls not only the protection switching equipment in the end station but also the protection switching equipments in the drop-insert stations through slave control units in the drop-insert stations. Therefore, because of connecting the line terminal equipments in the drop-insert station by the connecting line, the amount of software used to a CPU in the master control unit of the end station can be reduced, which results in reducing the switching time.

BRIEF DESCRIPTION OF THE DRAWINGS

FIG. 6(b) is a block diagram of an internal circuit of the protection switching equipment controlled by the method embodying the present invention in a case where no disconnection trouble occurs on first preceding and succeeding work lines, looking from the drop-insert station;

FIG. 6(c) is a block diagram of an internal circuit of the protection switching equipment controlled by the method embodying the present invention in any one of cases where a disconnection trouble occurs on the first preceding work line and where disconnection troubles occur on both the first preceding and succeeding work lines; and FIG. 6(d) is a block diagram of an internal circuit of the protection switching equipment controlled by the method embodying the present invention in a case where a disconnection trouble occurs on the first succeeding work line.

DESCRIPTION OF THE PREFERRED EMBODIMENT

Figure 1:
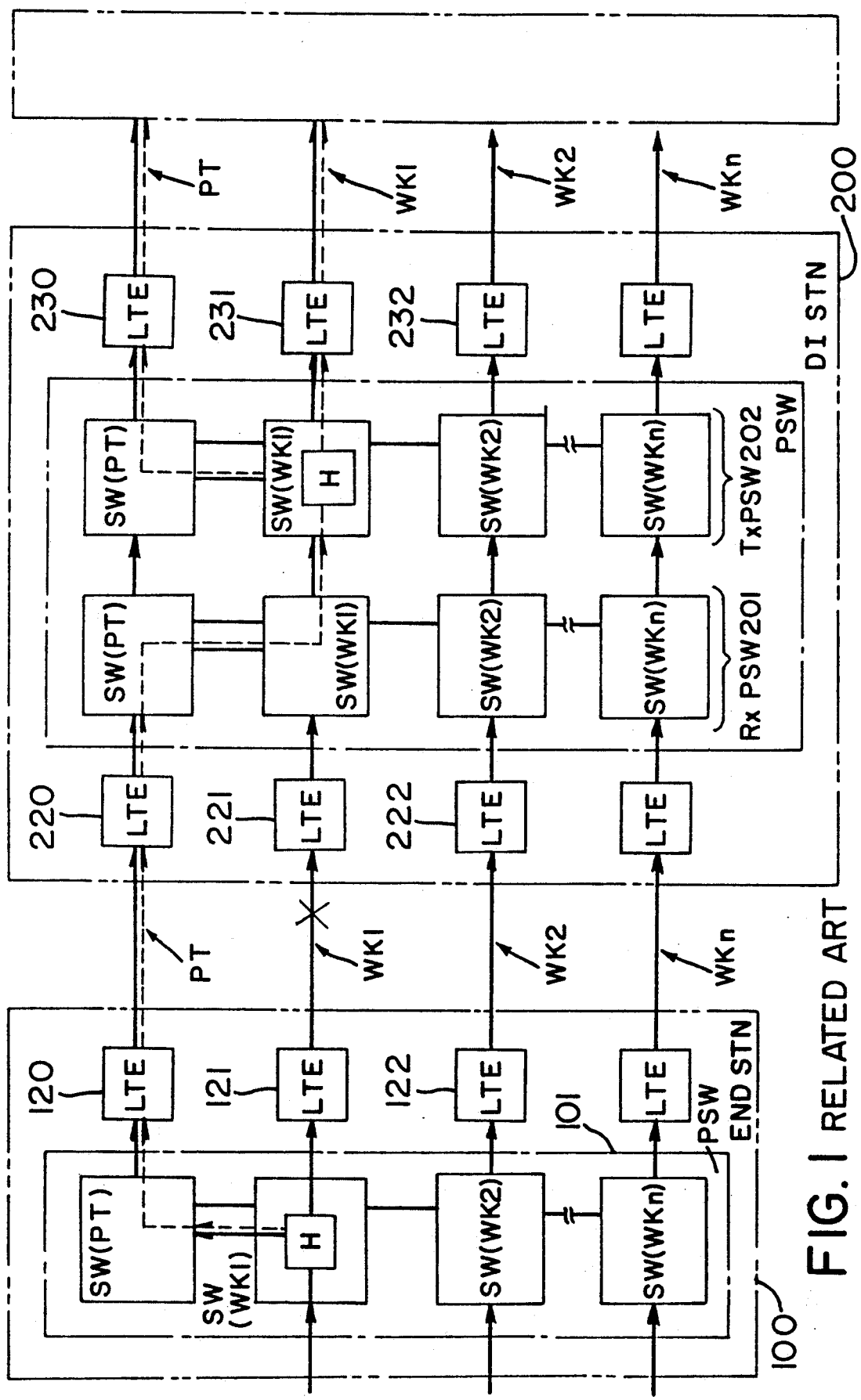
FIG. 1 is a block diagram of a transmission system, illustrating a principle of a signal branching method applied to a protection switching equipment provided in a drop-insert station of the transmission system of the related art.
Figure 2:
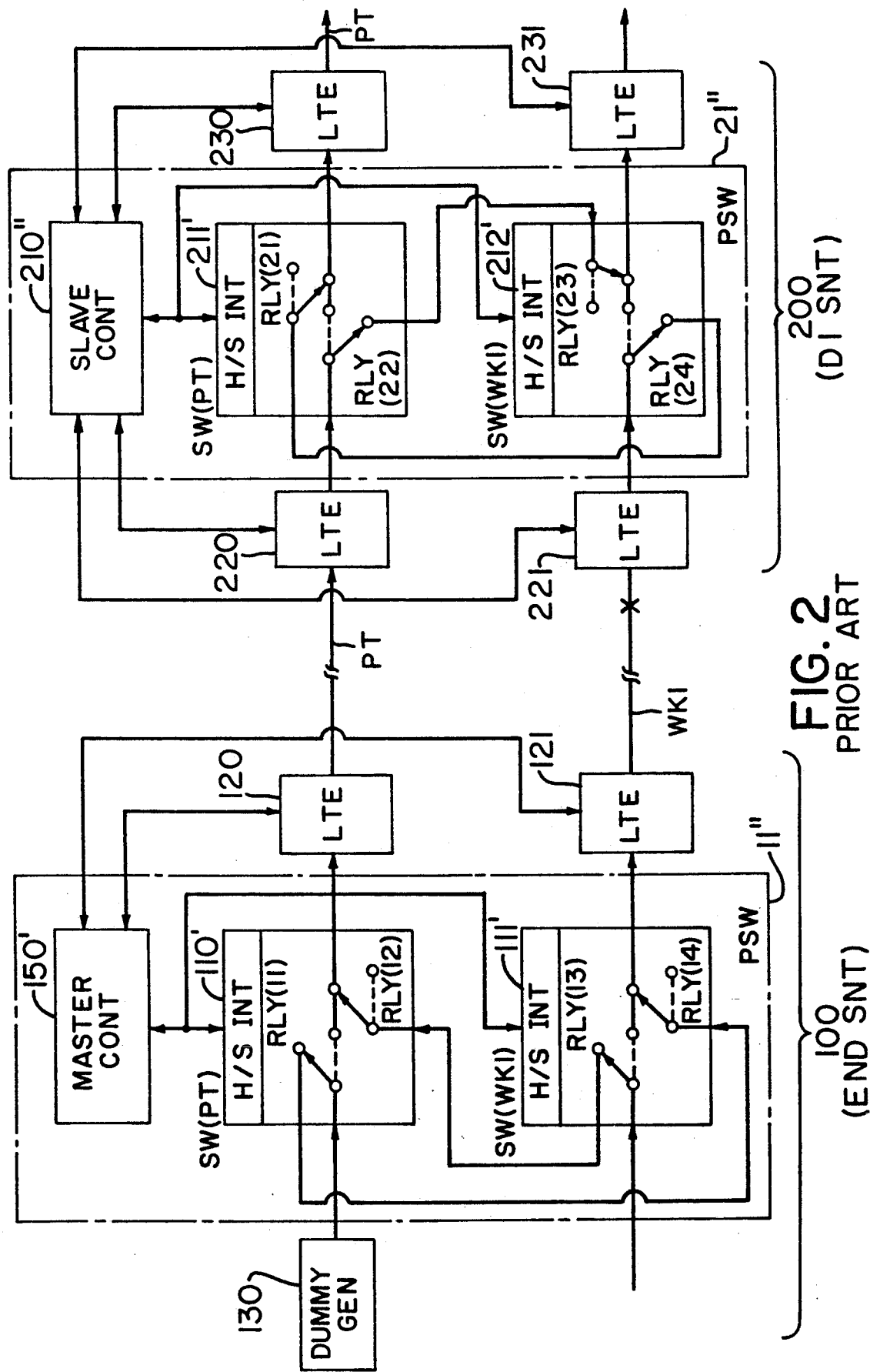
FIG. 2 is a block diagram of the transmission system of the prior art consisting of an end station including a protection switching equipment in which a dummy generator is provided for producing a dummy signal as a protection signal.
Figure 3:
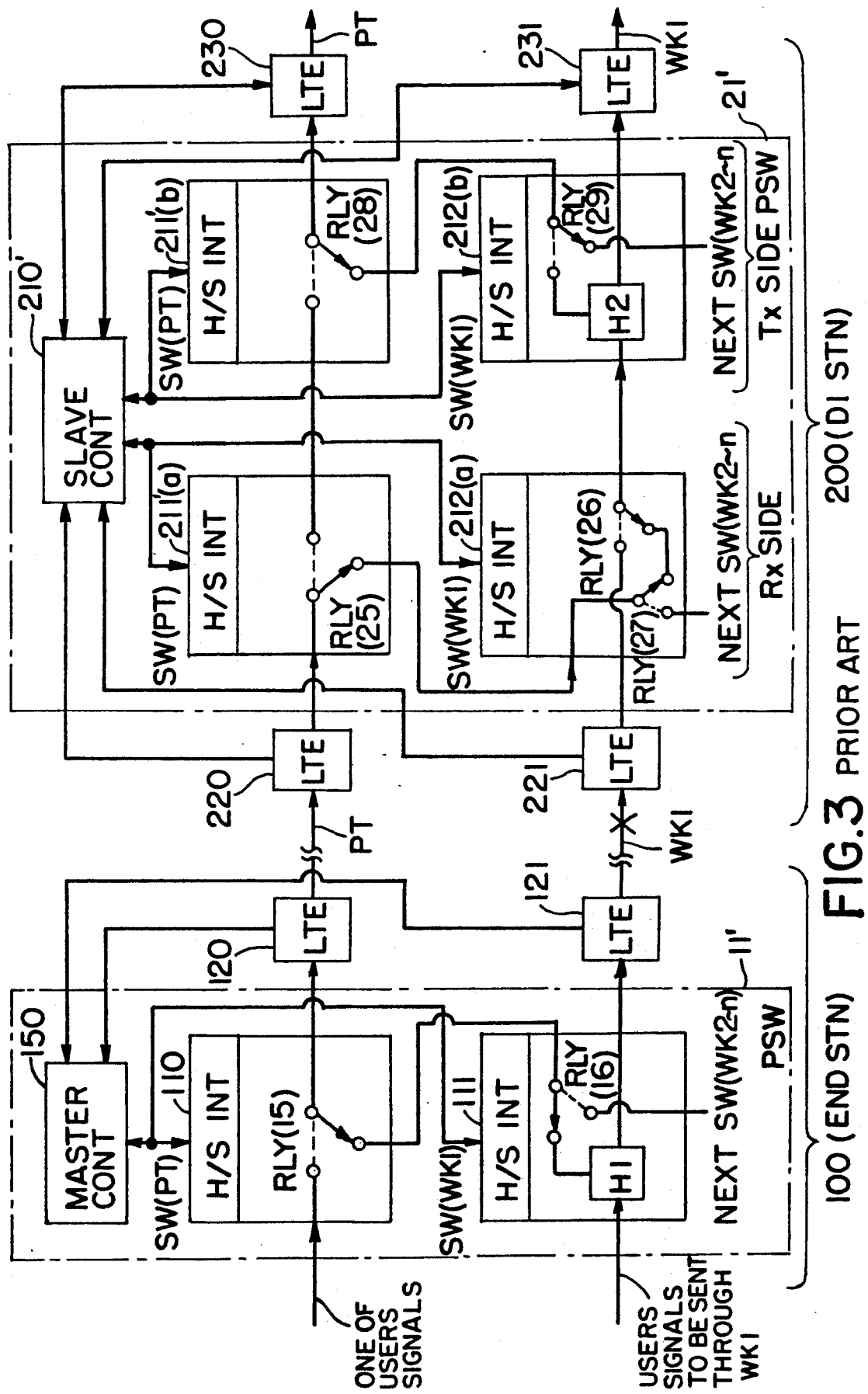
FIG. 3 is a block diagram of the transmission system of the prior art using a users signal as the protection signal, instead of the dummy signal.

A preferred embodiment of the present invention will be explained in reference to FIGS. 5 and 4(b). FIG. 5 is a block diagram of the transmission system using one of the users signals as the protection signal same as the transmission system described in reference to FIG. 3. The constitution of the block diagram in FIG. 5 is same as that in FIG. 3 except that PSW of DI STN is improved so as to meet with a signal branching method embodying the present invention. In FIG. 5, the same reference numeral or symbol as in FIG. 3 designates the same equipment, unit or part as in FIG. 3. Same as in FIG. 3, FIG. 5 shows a case of having a disconnection trouble on WK1, so that the users signal to be transmitted through WK1 branches to LTE 120 at END STN 100 for being transmitted to DI STN 200 through PT in accordance with the control of MASTER CONT 150. When a disconnection trouble occurs on WK1 as marked by "X" in FIG. 5, same as described in reference to FIG. 3, the detection signal from LTE 221 in DI STN 200 is sent to SLAVE CONT 210 in DT STN 200 and sent to MASTER CONT 150 in END STN 100 from SLAVE CONT 210 through LTE 220, PT, LTE 120. Then, same as in FIG. 3, MASTER CONT 150 controls own PSW 11 in END STN 100 so that RLYs(15) and (16) make connection of circuit as shown in FIG. 5, and MASTER CONT 150 sends a command signal to SLAVE CONT 210 so as to make SLAVE CONT 210 control the switches in PSW 21 in DI STN 200 as shown in FIG. 5.

However, different from FIG. 3, in FIG. 5, the output terminal of LTE 220 is connected to the input terminal of LTE 230 by a connecting line 250. Providing the connecting line 250 thus, additional elements are provided in PSW 21. That is, an RLY(30) is provided in SW(PT) 211(b) so that one contact of RLY(30) is connected to one contact of RLY(28). The other contact of RLY(30) is terminated by a resistor R3. A resistor R1 is provided on the connecting line 250 so that the output terminal of LTE 220 is connected to RLY(30) through R1. A contact of RLY(25), which is, in FIG. 3, connected to a contact of RLY(28), is terminated by R2.

As a result, the switches in PSW 21 operate as follows in correspondence to work line having the disconnection trouble in FIG. 5:

When (case 1) there is no disconnection trouble on WKs between END STN 100 and DI STN 200 and between DI STN 200 and the succeeding STN of DI STN 200, MASTER CONT 150 controls SLAVE CONT 210. Then, SLAVE CONT 200 controls the switches in PSW 21 so that RLY(25) connects the output terminal of LTE 220 to R2, RLYs(30 and 28) connect the output terminal of LTE 220 to the input terminal of LTE 230 by the connecting line 250 including R1, RLY(26) connects the output terminal of LTE 221 to the input terminal of LTE 231 through H2 in SW(WK1) 212(b), and the branch output of H2 is disconnected to the input terminal of LTE 230 because of disconnecting contacts of RLY(29) and RLY(28). As a result, the protection signal sent from END STN 100 to DI STN 200 is sent to the succeeding STN of DI STN 200 through the connecting line 250, and the users signal sent from END STN 100 to DI STN 200 through WK1 is sent to the succeeding STN through H2. A circuit formed by RLYs in PSW 21 in case 1 is illustrated in FIG. 6(b).

When (case 2), WKs between DI STN 200 and the succeeding STN have no disconnecting trouble but WK1 between END STN 100 and DI STN 200 has the disconnection trouble as shown in FIG. 5, under the control of MASTER CONT 150 and SLAVE CONT 200, RLYs(25, 26, 27, 28, 29 and 30) make connection of circuits as shown in FIG. 5. In other words, in case 2, the branch users signal sent from END STN 100 is transferred to the succeeding STN through the connecting line 250 in PSW 21, used as a protection signal on PT between DI STN 200 and the succeeding STN of DI STN 200, and at the same time, the branch users signal is switched back to WK1 between DI STN 200 and the succeeding STN, in PSW 21. A circuit in case 2, formed by RLYs in PSW 21 is illustrated in FIG. 6(c).

When (case 3) only WK 1 between DI STN 200 and the succeeding STN of DI STN 200 has a disconnection trouble, under the control of MASTER CONT 150 and SLAVE CONT 200, RLY(25) connects the output terminal of LTE 220 to R2, RLY(26) connects the output terminal of LTE 221 to H2, RLY(29) connects the branch users signal output of H2 to RLY(28), RLY(30) terminates the connecting line 250 by R3, and RLY(28) connects the input terminal of LTE 230 to RLY(29), so that the users signal to be transmitted through WK1 between DI STN 200 and the succeeding STN is switched to PT between DI STN 200 and the succeeding STN. A circuit in case 3 formed by RLYs in PSW 21 is illustrated in FIG. 6(d).

When (case 4) both WK1s between END STN 100 and DI STN 200 and between DI STN 200 and the succeeding STN of DI STN 200 have disconnection troubles, all RLYs(25, 26, 27, 28, 29 and 30) make connections as shown in FIG. 5, same as in case 2.

Figure 6A:
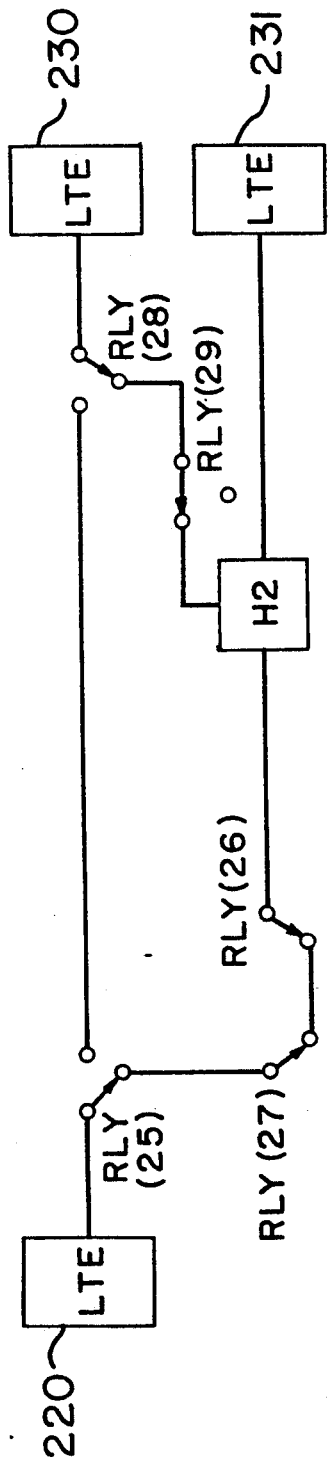
FIG. 6(a) is a block diagram of an internal circuit of the protection switching equipment controlled by the prior art method.
Figure 6A:
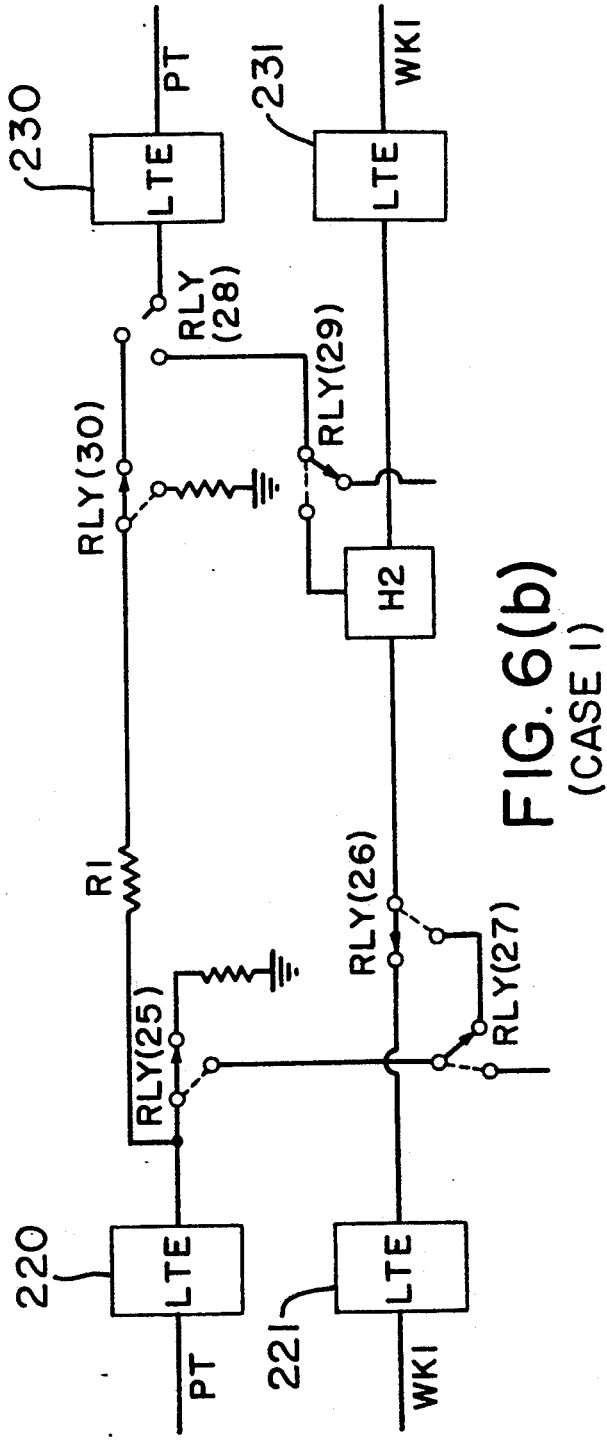

In the above cases 1 to 4, R1, R2 and R3 are provided in consideration of impedance matching to LTEs 220 and 230, which will be easily understood by comparing FIGS. 6(b, c and d) with FIG. 6(a) which is a circuit in case of the prior art explained in reference to FIG. 3. For instance, in cases 2 and 4 (FIG. 6(c)), it will be understood by comparing FIG. 6(c) with FIG. 6(a) that R1 has resistance equivalent in impedance obtained by subtracting input impedance of LTE 230 from input impedance of the hybrid transistor circuit H2 of SW(wk1) 212(b) when the hybrid transistor circuit connected to LTE 230.

Figures 4A, 4B:
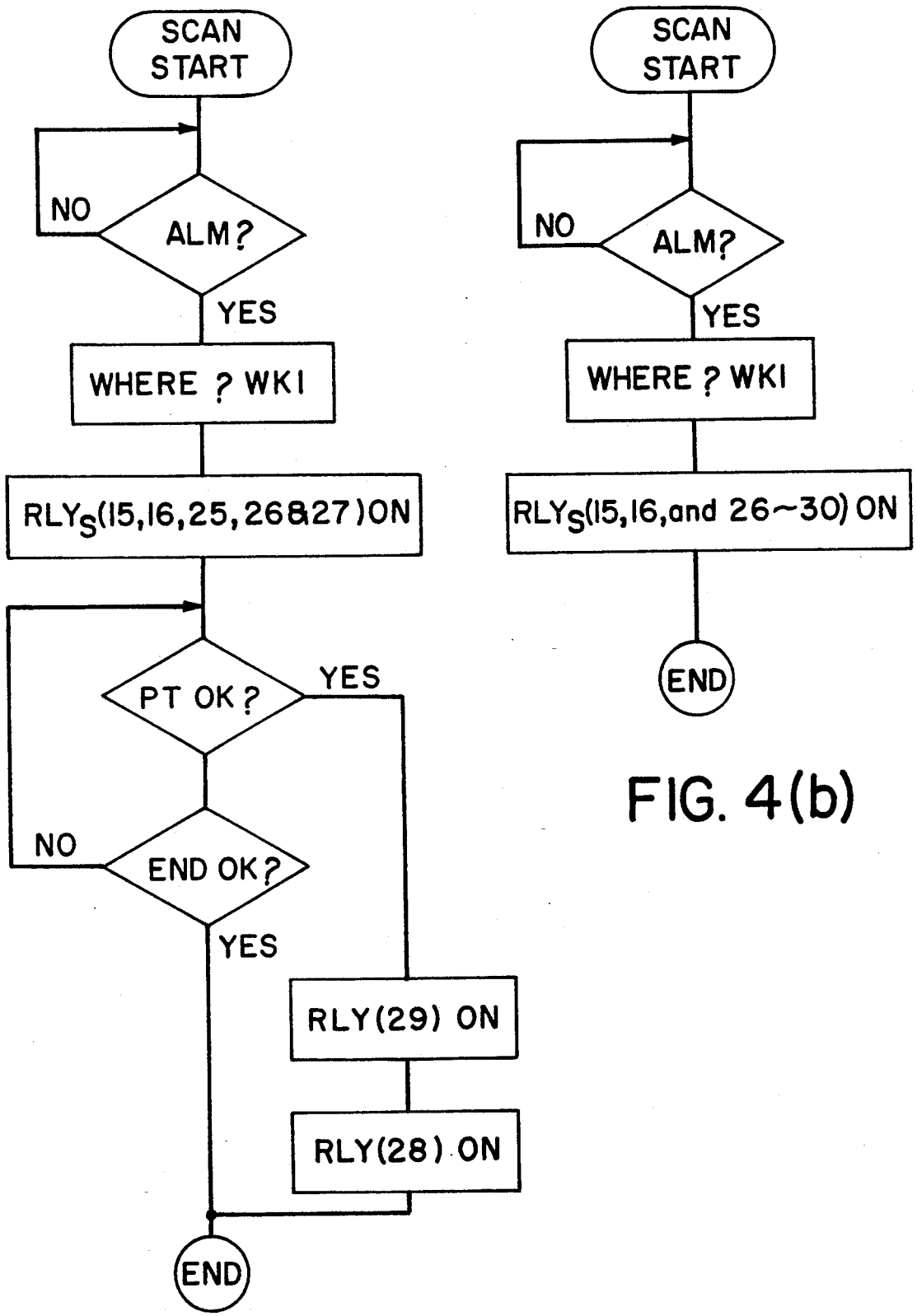
FIG. 4(a) is a flow chart in which a master control unit in the protection switching equipment of the end station controls the protection switching equipments in the end station and the drop-insert stations, using a signal branching method of the prior art.
FIG. 4(b) is a flow chart in which the master control unit controls the protection switching equipments in the end station and the drop-insert stations, using a signal branching method embodying the present invention.
Figure 5:
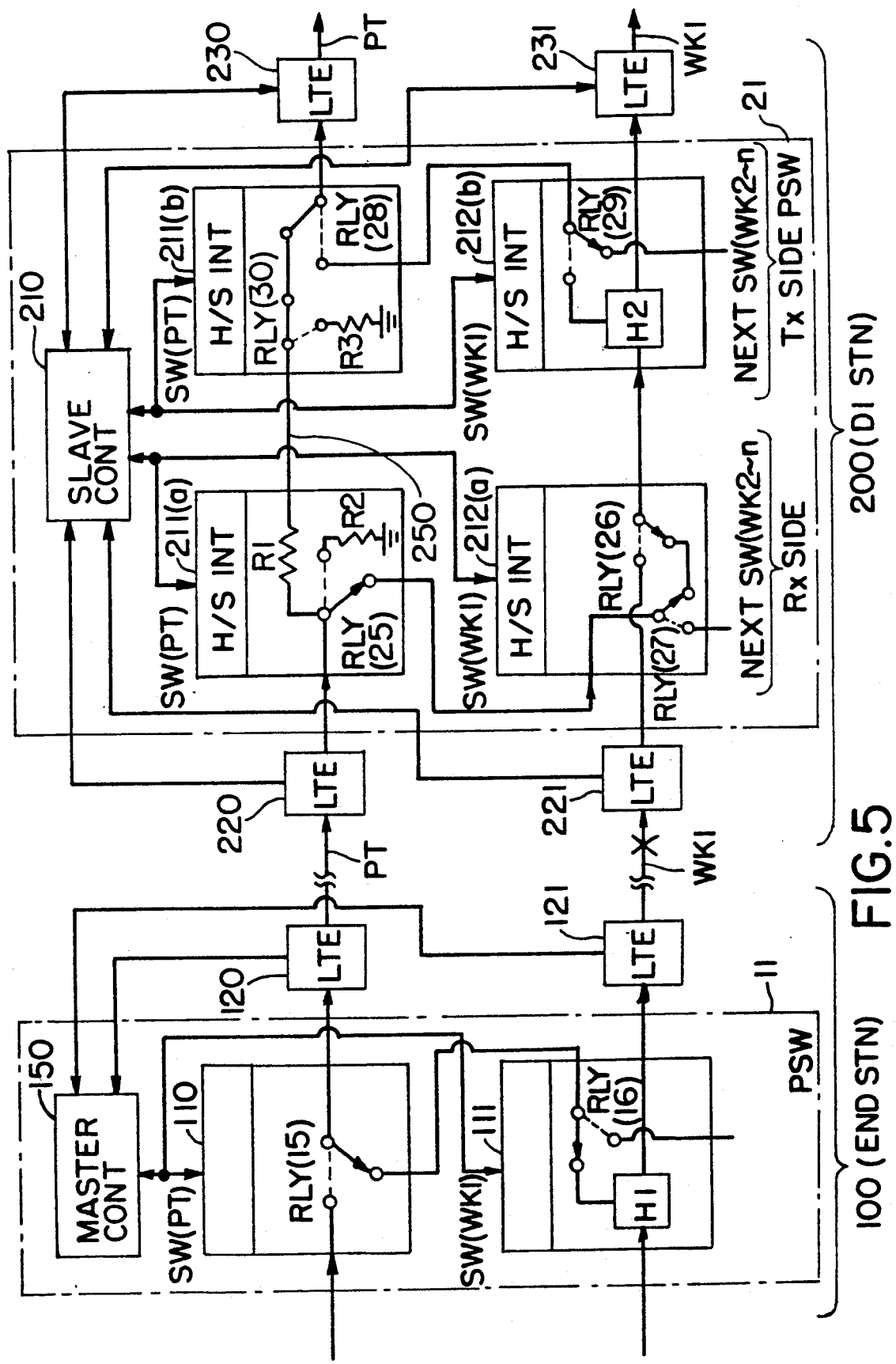
FIG. 5 is a block diagram of the transmission system in which the protection switching equipment of the drop-insert station is improved so as to meet with the signal branching method embodying the present invention.

Connecting LTE 220 with LTE 230, a load of MASTER CONT 150 to control PSW 11 in END STN 100 and to control PSW 21 in DI STN 200 decreases as shown by the control flow chart in FIG. 4(b). In FIG. 4(b), the same reference symbol as in FIG. 4(a) designates the same step as in FIG. 4(a).

When WK1 between END STN 100 and DI STN 200 has a disconnection trouble, MASTER CONT 150 operates in accordance with the control flow chart in FIG. 4(b), as follows:

periodically scans (SCAN START) whether there is a disconnection trouble in WK (ALM?);

when MASTER CONT 150 receives a detection signal envoying the occurrence of the disconnection trouble, MASTER CONT 150 searches where the detection signal comes from and recognizes that the alarm signal comes from WK1 between END STN 100 and DI STN 200 (WHERE? WK1); and then, MASTER CONT 150 controls RLYs(15) and (16) in PSW 11 of END STN 100 so as to connect a circuit in PSW 11 as shown in FIG. 5 and sends a command signal to SLAVE CONT 210 through LTE 120, PT and LTE 220 so that SLAVE CONT 210 controls RLYs(25, 26, 27, 28, 29 and 30) so as to make a connecting circuit in PSW 21 as shown in FIG. 5 (RLYs(15, 16, 25, 26, 27, 28, 29 and 30)).

Comparing the control flow charts in FIGS. 4(a) and 4(b), the number of steps extremely decreases. As a result, the switching time is reduced to 60% of the usual switching time.

What is claimed is:

1. A signal branching method applied to a protection switching equipment provided in a drop-insert station of a transmission system, for protecting transmission of a users signal from being obstructed when a disconnection trouble occurs on one of work lines of the transmission system, by switching a protection signal transmitted through a protection line of the transmission system from a designated users signal used as the protection signal to the users signal obstructed by the disconnection trouble, the method comprising the steps of:

providing in said drop-insert station including a first line terminal equipment, a second line terminal equipment and said protection switching equipment, an internal connecting line provided in said protection switching equipment for connecting an output of said first line terminal equipment to an input of said second line terminal equipment;

transferring a signal, transferred from a preceding station which precedes the drop-insert station through a preceding protection line and received at said first line terminal equipment in the drop-insert station, to said second line terminal equipment in the drop-insert station through said internal connecting line, said internal connection line transmitting said signal to said second line terminal equipment as the protection signal received from said preceding station when no disconnection trouble occurs on preceding work lines provided between the drop-insert station and the preceding station and succeeding work lines provided between the drop-insert station and a succeeding station which succeeds the drop-insert station and wherein, when the disconnection trouble occurs on one of the preceding work lines, said connecting line transfers one of users signals, which is obstructed by the disconnection trouble and is transferred from the preceding station to the drop-insert station through the preceding work lines provided between the preceding station and the drop-insert station and received at said first line terminal equipment, to said second line terminal equipment; and stopping the protection signal from being transferred from the first line terminal equipment to the second line terminal equipment when the disconnection trouble occurs on one of the succeeding work lines.

2. A signal branching method according to claim 1, wherein said internal connecting line includes a resistor used for impedance matching in the protection switching equipment.

3. A signal branching method according to claim 1, and further comprising the steps of:

providing a third line terminal equipment and a fourth line terminal equipment in said drop-insert station;

transferring the users signal received at the first line terminal equipment when the disconnection trouble occurs on one of the preceding work lines, from the first line terminal equipment to the fourth line terminal equipment provided in the drop-insert station, for transmitting said users signal from the drop-insert station to the succeeding station; and switching a sending destination of a users signal supplied from the preceding station and received at the third line terminal equipment provided in the drop-insert station from the fourth line terminal equipment to the second line terminal equipment when the disconnection trouble occurs on a preceding work line connected to the fourth line terminal equipment.

4. A protection switching equipment in a drop-insert station of a transmission system, for protecting transmission of a users signal from being obstructed when a disconnection trouble occurs on a work line of the transmission system through which the users signal is transmitted, by switching a protection signal transmitted through a protection line of the transmission system from one of users signals used as the protection signal to the users signal obstructed by the disconnection trouble, the drop-insert station comprising a first line terminal equipment, a second line terminal equipment, and said protection switching equipment;

said protection switching equipment including:

a connection line provided internally in said protecting switching equipment for connecting an output of said first line terminal equipment to an input of said second line terminal equipment when no disconnection trouble occurs on preceding work lines provided between the drop-insert station and a preceding station which precedes the drop-insert station and succeeding work lines provided between the drop-insert station and a succeeding station which succeeds the drop-insert station, wherein, when the disconnection trouble occurs on one of the preceding work lines and when disconnection troubles occur on a first preceding work line and a first succeeding work line substantially connected to the first preceding work line through the drop-insert station, said first and second line terminal equipments receive the protection signal from the preceding station and transmit the protection signal to the succeeding station; and first switch means provided on said connection line for disconnecting said connection line in the protection switching equipment when the disconnection trouble occurs on one of the succeeding work lines.

5. A protection switching equipment according to claim 4, and further comprising:

a hybrid transistor circuit provided substantially between a third line terminal equipment and a fourth line terminal equipment of the drop-insert station and having an input terminal, a first output terminal connected to the fourth line terminal equipment and a second output terminal substantially connected to the second line terminal equipment, for outputting branch signals of an input signal to the input terminal of said hybrid transistor circuit from the first and second output terminals of the hybrid transistor circuit, respectively, said third and fourth line terminal equipments being provided in the drop-insert station for receiving a users signal from the preceding station through a first preceding work line and transmitting substantially the users signal passed through the protection switching equipment to the succeeding station through a first succeeding work line;

second switch means for connecting the input terminal of said hybrid transistor circuit to the third line terminal equipment when no disconnection trouble occurs on the first preceding and the first succeeding work lines and when the disconnection trouble occurs on the first succeeding work line, and for connecting the input terminal of said hybrid transistor circuit to the first line terminal equipment when the disconnection trouble occurs on the first preceding work line and when disconnection trouble occurs on the first preceding and succeeding work lines; and third switch means for connecting the second output terminal of said hybrid transistor circuit to the second line terminal equipment in cooperation with said first switching means when the disconnection trouble occurs on the first succeeding work line.

6. A protection switching equipment according to claim 4, wherein said connection line includes a resistor having resistance for impedance matching in the protection switching equipment, said resistance being equivalent in impedance when a users signal passes through said hybrid transistor circuit.

7. A protection switching equipment according to claim 5, and further comprising a slave control unit for controlling operations of said first, second and third switch means under control of a master control unit provided in an end station of the transmission system.

* * * * *